Feb. 3, 1942. J. E. CLEMINGS 2,271,812
WAFFLE REMOVER AND SERVER
Filed March 25, 1941
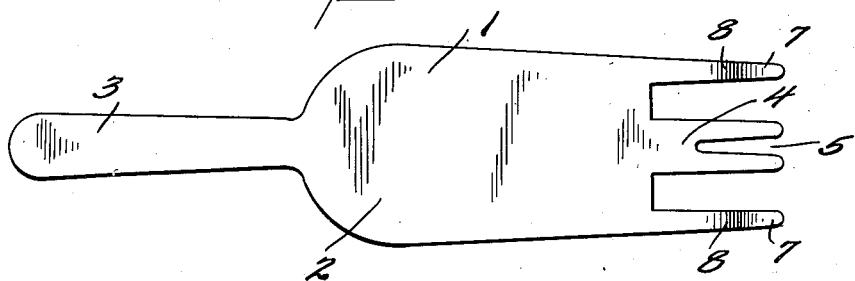
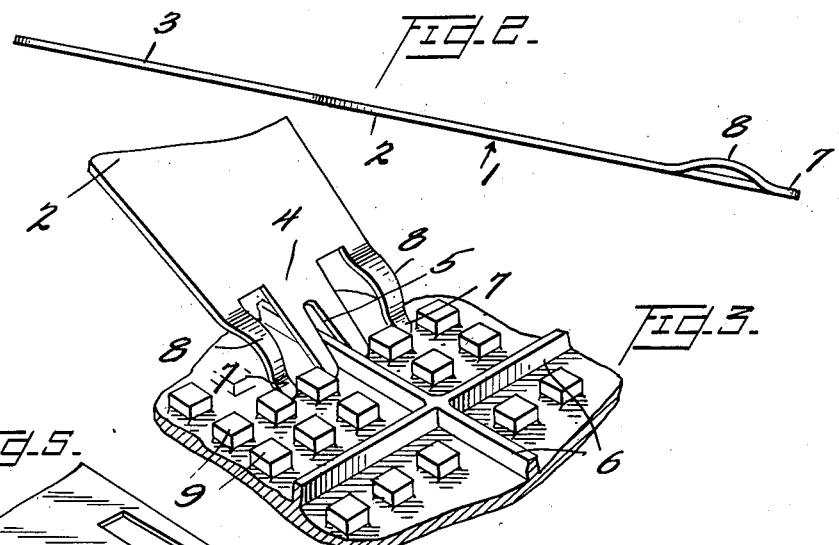
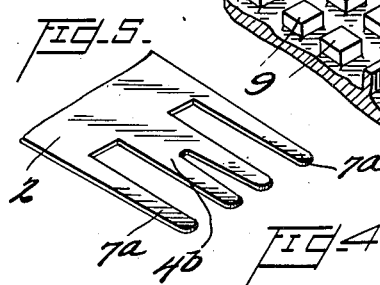
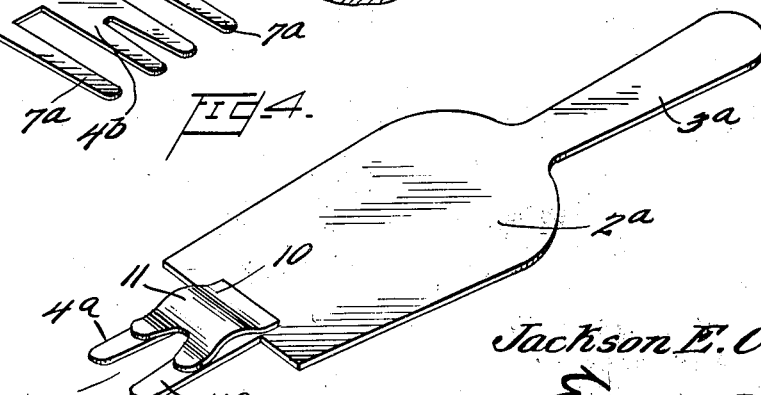
Inventor
Jackson E. Clemings,
By Eugene K. Purdy
his Attorney Patented Feb. 3, 1942

2,271,812

UNITED STATES PATENT OFFICE 2,271,812

WAFFLE REMOVER AND SERVER

Jackson E. Clemings, Tucson, Ariz.

Application March 25, 1941, Serial No. 385,127

5 Claims. (Cl. 294—7)

This invention relates to utensils for facilitating the removal of waffles from the grid and for serving the same.

An important object of my invention is to provide a waffle remover and server having means co-operating with elements upon the grid for guiding the device across the grid, and additional means for elevating and stripping the waffle free from the grid and lifting it onto a support for removal from the grid.

Another object of my invention is to provide a waffle remover and server of simple and inexpensive construction which obviates the annoyance occasioned by reason of the tendency of waffles to stick to the grid when baked.

Other objects and advantages will be apparent from the following detailed description of a preferred embodiment of the invention, reference being had to the annexed drawing, in which:

Figure 1 is a plan view of a waffle remover and server;

Figure 2 is a side view of the device of Fig. 1;

Figure 3 illustrates the manner in which the waffle remover and server is used;

Figure 4 is a perspective view of a modified form of waffle remover and server; and Figure 5 is a fragmentary showing of another embodiment of the invention.

Referring to the drawing, in Fig. 1 is shown a waffle remover and server 1 adapted to be stamped out of light gauge sheet metal, which is desirably plated with nickel or other material so as to present a neat and attractive appearance and to withstand attack by grease or acids. This device comprises a flat rectangular waffle supporting portion 2 of substantial area, and a handle 3 integral with and extending longitudinally from one end of the support. Extending centrally from the other end of the waffle support is a tongue 4 longitudinally divided at its end by a guide slot 5, the guide slot being of such a size as to straddle the ribs 6 cross-dividing a waffle iron into sections (Fig. 3).

Arranged so as to lie parallel to the tongue 4 and disposed upon opposite sides thereof are elevating prongs 7, these prongs being integral extensions of the support 2 and terminating approximately in line with the bifurcated end of the tongue. The ends of the tongue and the prongs are preferably rounded, as shown in Fig. 1. As best shown in Fig. 2, these prongs are arched out of the plane of the support so as to provide a pair of humps 8. The distance laterally spacing the prongs 7 from the tongue 4 is such as to provide clearance for a row of projections 9 forming part of the grid of a waffle iron, and the prongs are of a width sufficient to freely pass along the channel defined by adjacent rows of these projections extending parallel to the ribs 6.

The manner of using my waffle remover and server is illustrated in Fig. 3. When a waffle is to be removed from the grid, the upper section of the waffle iron is raised in the usual manner, the prongs of the remover are inserted under an edge of the waffle with the guide slot 5 of tongue 4 engaging a rib 6, and the remover is pushed along this rib by means of the handle 3. The prongs 7 pass under the waffle and strip it from the grid, the humps 8 serving to elevate the waffle and draw it free from those portions of the grid lying laterally beyond the prongs. When the tongue 4 abuts a rib 6 lying at right angles to the rib upon which the tongue is riding, the handle may be lowered to allow the tongue to jump over this junction and continue its travel along the rib at the opposite side thereof.

Ordinarily the waffle will be freed from the grid after the remover has made one traverse of the waffle iron; however, should the waffle continue to stick, the remover may be withdrawn and inserted under another edge of the waffle and a traverse made along the rib 6 disposed at right angles to the rib used originally as a guide. When the waffle comes free from the grid, it will rest upon the flat surface of support 2, and the waffle may be lifted from the grid and served from this support onto a plate or other receptacle. Should the waffle stick to both the upper and lower sections of the grid, the waffle will spring sufficiently to allow the entrance of the server thereunder so that the device may be manipulated so as to first strip the waffle from one surface of the grid and afterwards from its other surface.

Another embodiment of my invention is illustrated in Fig. 4. In this form of waffle remover and server, the support 2a, handle 3a and tongue 4a are constructed in essentially the same manner as the corresponding members 2, 3 and 4 of the form of the device just described. Instead of providing a pair of elevating prongs 7 upon opposite sides of the tongue, as in the case of the device of Figs. 1, 2 and 3, an elevating plate 10 is secured at one end to the support 2a so as to overlie the tongue 4a adjacent the upper or closed end of its slot 5a, this plate being arched, as indicated at 11, so as to raise the waffle free of the grid and allow it to slide over onto the flat support 2a.

The operation of this form of my device is substantially the same as that originally described.

Both embodiments of the invention serve to strip waffles from the grid quickly and without mutilation. Because of its simplicity and cheapness of construction, the invention is especially suitable for use as an advertising novelty or souvenir, the flat surface of the support being adapted to carry advertising matter stamped thereon.

Fig. 5 shows another form which the waffle remover and server may take. This embodiment of the invention is substantially the same as that illustrated in Figs. 1 and 2, except that the humps 8 are omitted from the prongs 7a. The flat prongs 7a will ordinarily function effectively to strip the waffle from the grid and elevate it onto the support 2. The slotted tongue 4b serves as a guide.

It should be understood that it is not desired to limit the invention to the exact details of construction herein shown and described, for obvious modifications within the scope of the claims may occur to persons skilled in the art.

I claim:

1. A waffle remover and server comprising a support, a handle extending from one end of the support, guide means extending from the opposite end of the support adapted to engage and travel along a sectional dividing rib of a waffle iron and elevating means associated with the support for lifting a waffle above and in advance of the support.

2. A waffle remover and server comprising a flat support, a handle extending from one end of the support, a tongue extending from the opposite end of the support, said tongue having a slot adapted to engage and travel along a sectional dividing rib of a waffle iron, and elevating means associated with the support for lifting a waffle onto the support.

3. A waffle remover and server comprising a flat support, a handle extending from one end of the support, a tongue extending from the opposite end of the support, said tongue having a slot adapted to engage and travel along a sectional dividing rib of a waffle iron, elevating prongs arranged upon opposite sides of said tongue in spaced relation thereto and each so constructed and arranged as to engage the recess between adjacent and parallel rows of projections upon a waffle iron, said prongs being arched above the plane of the support for lifting a waffle onto the support.

4. A waffle remover and server comprising a flat support, a handle extending from one end of the support, a tongue extending from the opposite end of the support, said tongue having a slot adapted to engage and travel along a sectional dividing rib of a waffle iron, and an elevating plate secured upon said tongue, said plate being arched above the plane of the support for lifting a waffle onto the support.

5. A waffle remover and server comprising a support, a handle extending from one end of the support, guide means extending from the opposite end of the support adapted to engage and travel along a sectional dividing rib of a waffle iron to strip the waffle free from the grid, and prongs lying parallel to the guide means and laterally spaced therefrom.

JACKSON E. CLEMINGS.